US007533139B2

(12) United States Patent
Jones et al.

(10) Patent No.: US 7,533,139 B2
(45) Date of Patent: May 12, 2009

(54) METHOD AND SYSTEM FOR MULTITHREAD PROCESSING OF SPREADSHEET CHAIN CALCULATIONS

(75) Inventors: Bruce Cordell Jones, Bellevue, WA (US); Chad B. Rothschiller, Edmonds, WA (US); David F. Gainer, Redmond, WA (US); Jeffrey J. Duzak, Redmond, WA (US); Matthew J. Androski, Bellevue, WA (US); Duane Campbell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 10/951,576

(22) Filed: Sep. 27, 2004

(65) Prior Publication Data

US 2006/0069993 A1    Mar. 30, 2006

(51) Int. Cl.
*G06F 7/00* (2006.01)
(52) U.S. Cl. .................................................. 708/200
(58) Field of Classification Search .................. 708/200
See application file for complete search history.

(56) References Cited

U.S. PATENT DOCUMENTS

| | | | |
|---|---|---|---|
| 5,276,607 A | 1/1994 | Harris et al. | |
| 5,694,603 A | 12/1997 | Reiffin | |
| 5,943,663 A * | 8/1999 | Mouradian | 706/45 |
| 6,055,548 A | 4/2000 | Comer et al. | |
| 6,138,130 A * | 10/2000 | Adler et al. | 715/503 |
| 6,304,866 B1 | 10/2001 | Chow et al. | |
| 6,330,661 B1 | 12/2001 | Torii | |
| 6,430,584 B1 | 8/2002 | Comer et al. | |
| 6,349,295 B1 | 2/2003 | Tedesco et al. | |
| 6,795,845 B2 | 9/2004 | Kalafatis et al. | |
| 6,934,910 B2 | 8/2005 | Lange | |
| 6,957,191 B1 | 10/2005 | Belcsak et al. | |
| 7,010,779 B2 | 3/2006 | Rubin et al. | |
| 2001/0056440 A1 | 12/2001 | Abramson et al. | |
| 2002/0184261 A1 | 12/2002 | Yamane | |
| 2003/0167389 A1 | 9/2003 | Soltis, Jr. et al. | |
| 2003/0233313 A1 | 12/2003 | Bartolucci | |
| 2004/0103366 A1 | 5/2004 | Peyton-Jones et al. | |
| 2004/0139433 A1 | 7/2004 | Blythe et al. | |

(Continued)

FOREIGN PATENT DOCUMENTS

EP    1152331    11/2001

OTHER PUBLICATIONS

Abramson, et al., "ActiveSheets: Super-Computing with Spreadsheets". 2001 High Performance Computing Symposium (HPC'01), Advanced Simulation Technologies Conference, Apr. 22-26, 2001, pp. 110-115, Seattle, Washington (USA). http://www.csse.monash.edu.au/~davida/papers/ActiveSheets.pdf.

(Continued)

*Primary Examiner*—Tan V Mai
(74) *Attorney, Agent, or Firm*—Merchant & Gould PC

(57) ABSTRACT

Embodiments of the invention involve a method of concurrent processing of chain calculations using multiple processors each having a separate recalculation engine in a spreadsheet program. The operations basically include first determining a number of available processors, then allocating a recalculation engine to each available processor, distributing the formulas between the recalculation engines, and then concurrently evaluating the formulas distributed to each recalculation engine when a recalc operation is called for in the spreadsheet program.

19 Claims, 9 Drawing Sheets

U.S. PATENT DOCUMENTS

| | | | |
|---|---|---|---|
| 2004/0148603 A1 | 7/2004 | Baylis | |
| 2004/0210822 A1 | 10/2004 | Kotler et al. | |
| 2004/0249852 A1* | 12/2004 | Aureglia et al. | 707/102 |
| 2005/0050088 A1 | 3/2005 | Kotler et al. | |
| 2005/0267853 A1 | 12/2005 | Netz et al. | |
| 2006/0069993 A1 | 3/2006 | Jones et al. | |
| 2006/0117246 A1* | 6/2006 | Bauchot et al. | 715/503 |
| 2007/0260667 A1 | 11/2007 | Duzak et al. | |

OTHER PUBLICATIONS

Andrews, Dave; Trask, Matt, "OS/2 Gets Lean and Mean," Byte, V.19, N8, p. 26-27, Aug. 1994.
Balakrishnan, Jaydeep; et al. "Manufacturing Cell Formation Using Spreadsheets: Formulation and Comparison," Conference: Western Decision Sciences Institute—Annual meeting 1994.
Baumann, Knut. Accord for Excel,: IEE, 1997.
Berghaus, Nona. "Teach Spreadsheet Proficiency with Personal Money Management Projects," IEE, Apr. 1990.
Beynon, W.M.; et al. "Programming Principles for Visualization in Mathematical Research," IEE, 1991.
Bland, C.J. "Using Spread-Sheet Software for Radiometric Spectral Analysis," IEE,, Sep.-Oct. 1996.
Brown, A.M., "Simulation of Axonal Excitability Using a Spreadsheet Template Created in Microsoft Excel," Computer Methods and Programs in Biomedicine, Vo.63, N.1, p. 47-54, Aug. 2000.
Brown, A.M. A Methodology for Simulating Biological Systems Using Microsoft Excel,: IEE, 1999.
Burke, Andrew F. "A Method for the Analysis of High Power Battery Designs," IEE, 1997.
Byington, Ian. "Statistics Spreadsheets for School Sports Teams," IEE, Nov. 1990.
Cahill, M.B.; Teaching Chain-Weight Real GDP Measures,: Journal of Economic Education, 2003, V34, N3, pp. 224-234.
Chains, Markov. "Search Process Evaluation for a Hierarchical Menu System ," IEE,, 2001.
Chan, BO. "Defects in Silicon Solar Cell Materials," ProQuest Info & Learning, Mar. 1993, [317 pages].
Chen, JJ; Zheng, GL, "NDC++," Journal: ACM Sigplan Notices, V32, N3, p. 50-56 (Mar. 1997).
Chi, E.J. et al., "A Spreadsheet Approach to Information Visualization," IEEE Symposium on Information Visualization, p. 17-24.
Chi, Ed Haui-Hsin. "A Framework for Information Visualization Spreadsheets (User Interface)," vol. 60/03-B, Dissertation Abstracts International, 1999, p. 1161.
Clarke, R., "Module Interconnection Frameworks for a Real-Time Spreadsheet," TRware, Inc., Oct. 19, 1993.
Clarkson, Barnard. "Spreadsheets Are a Language Too! 2 or A Step by Step Teaching Strategy for Spreadsheets," IEE, Dec. 1990.
Collins, M.T.; Morgan, I.R. "Epidemiologic Model of Paratuberculosis in Dairy-Cattle," 2004 Ints. For Sci. Info.
Collins, Michael T.; Morgan, Ian R. "Simulation-Model of Paratuberculosis Control in a Dairy-Herd," 2004 Inst. For Sci. Info.
Galletta, Dennis F..; et al. "An Experimental Study of Spreadsheet Presentation and Error Detection," IEE, 1996.
Gaul, Wayne; Underhill, Dwight. "A Simple Calculation for the Buildup and Decay of Radon Progeny," IEE,, Jun. 2001.
Gaylarde, Peter M.; Gaylarde, Christine C. "A Theoretical Model Describing the Influence of Diffusion on Microbicidal Action in Biofilms," 2004 Inst. For Sci. Info.
Haley, Sue. AppleMgr: A Prototype Decision Aid for Apple Pest Management, ProQuest Info & Learning, 1990, [136 pages].
Haney, W.W.; et al. "The Optimized NIF Laser System Based on ICF Target Requirements," IEE, 1997.
Heckman, J.L.; Hoffman, J.; Shaffer, T.H.; Wolfson, M.R., "Software for Real-Time Control of a Tidal Liquid Ventilator," Journal: Biomedical Instrumentation & Technology, V.33, N.3, p. 268-76, May-Jun. 1999.
Herter, Gerald. "Two Spreadsheet Productivity Packages," IEE,, Jul. 1992.
Holdich, R. "Simulation of Compressible Cake Filtration," Elsevier Eng. Info. Inc., 1994.
Kalogirou, Soteris. "Economic Analysis of Solar Energy Systems Using Spreadsheets," Proceedings 1996 World Renewable Energy Congress on Renewable Energy, Energy Efficiency and the Environment, 1996.
Keasler, Terrill R. Applying Computer Technology in a Financial Management: An Example of the Amortization Schedule,: IEE, 2000.
Lee, E.P.; et al. "Physics Design and Scaling of Elise," Fusion Engineering and Design 32-33 (1996), pp. 323-335.
Leopold, Jennifer L.; Ambler, Allen L. "A User Interface for the Visualization and Manipulation of Arrays," IEE, 1996.
Levoy, Marc. "Spreadsheets for Images," IEE, 1994.
Luther, et al., "Alchemi: A NET-based Grid Computing Framework and its Integration into Global Grids." Technical Report, GRIDS-TR-2003-8 (2003), www.alchemi.net/files/alchemi_techreport.pdf.
McHugh, J.M.; Kenyon, J. L. "An Excel-based Model of Ca2+ Diffusion and Fura 2 Measurements in a Spherical Cell," 2004 Inst. For Sci. Info.
Mittermeir et al., "Finding High-Level Structures in Spreadsheet Programs," Proceedings 9$^{th}$ Working conf. on Reverse Engineering WCRE 2002, pp. 221-232.
Morely, Lloyd A.; Novak, Thomas. "Impedance-Based Power-system Analysis Using a Spreadsheet," IEE, 1990.
Morishita, Etsuo. "Spreadsheet Fluid Dynamics," 2004 The HW Wilson Co No. BAST 99051108.
Mu, X.M.; Marchionini G., "An Architecture and Prototype Interface for an Online Statistical Table Browser," 64$^{th}$ ASIST Annual Meeting, vol. 38, 2001.
Mundkur, Siddharth Dinesh. "Separation Process Synthesis: A Knowledge-Based System Using Spreadsheet Macros".
Nadiminti, et al., "ExcelGrid: A .NET Plug-in for Outsourcing Excel Spreadsheet Workload to Enterprise and Global Grids", Technical Report, GRIDS-TR-2004-8, Grid Computing and Distributed Systems Laboratory, University of Melbourne, Australia, Aug. 17, 2004. www.gridbus.org/papers/ExcelGrid.pdf.
Ottinger, Thomas Patrick. "Conceptual and Procedural Learning in First-Year Algebra using Graphing Calculators and Computers," Conceptual Learning, Algebra, Calculators, ProQuest Info & Learning, 1993, pp. 1-171.
Padawitz, Peter. "Swinging Data Types—Syntax, Semantics, and Theory," 2004 Inst. For Sci. Info.
Parow, Ketil. "Designing a Horn Loudspeaker," Elsevier Eng. Info. Inc., 1996.
Pinero Mendez, Mayra I. "Development of Cost Models for Electronics Assemblies," ProQuest Information and Learing, May 25, 2001, pp. 1-418.
Pountian, Dick. "Starting with a Clean Sheet," 2004 The HW Wilson Co. No. BAST94065730.
Press release: "Decisioneering Announces CB Turbo for Crystal Ball, Industry's First Distributed Spreadsheet Analysis Engine" Mar. 24, 2006. http://www.crystalball.com/press/press/_cbt10.html.
Robert, Christian P.; et a;l. "Convergence Controls for MCMC Algorithms, with Applications to Hidden Markov Chains," 2004 INIST/CNRS.
Ruddle, AR. Benefits of General Purpose Mathematical Software in Modelling Electronic Systems,: IEE, 1998.
Saariluoma, Pertti; Sajaniemi, Jorma. "Transforming Verbal Descriptions into Mathematical Formulas in Spreadsheet Calculation," IEE, Dec. 1994.
Salmi, U.; et al. "CRISY: A CRItical Assemblies Documentation SYstem," IEE, 1990.
Sathaye, J.; et al. "A Comprehensive Mitigation Assessment Process (COMAP) for the Evaluation of Forestry Mitigation Options," 2004 Inst. For Sci. Info.
Scoville, R., "Spreadsheets. A Total of One (Windows 95)", Journal: PC World, V.13, N.10, p. 151, Oct. 1995.
Seppala, Ulla; Holmstrom, Jan. "Rough Modeling of Logistics Networks," IEE, 1995.
Sheriff, Steven D. "Forward Modeling of Electrical Sounding Experiments Using Convolution and a Spreadsheet," IEE, Jan. 1992.

Spenke, Michael et al.; InfoZoom: Analysing Formula One Racing Results with an Interactive Data Mining and Visualization Tool; Data Mining II: Cambridge, Jul. 5-7, 2000.

Stent, Alan F.; McCallum, Ian R. "Dynamic Simulation Modeling on a Spreadsheet," 2004 FIZ Technik.

Tetewsky, A.K., "GUI Development for Real-Time Applications," Journal: Dr. Dobb's Journal, V.19, N.6, pp. 28,30,32,26,38,40-41, Jun. 1994.

Towler, Brian F.; et al. "Spreadsheet Determines Hyperbolic-Decline Parameters," 2004 The HW Wilson Co. No. BAST94022046.

Trahan, Jr., Russell E.; et al. "An Improved Method for Design of Recursive Digital Filters Using Optimization," IEE, Jul. 1995.

Usuda, Shouji et al. Computer-Simulation with Spreadsheet to Analyze Crystalline Structure in Phase Change Recording Layer by Fractal Theory,; IEE,, 2001.

Walter, Donnal C.; McMillan, Michael M. "A Spreadsheet Method for Studying Neural Networks," IEE, 1990.

Wang, et al., "Loop Selection for Thread-Level Speculation."Workshops on Languages and Compilers for Parallel Computing, Hawthorne, New York, USA, Nov. 2-4, 2006. www.csc.lsu.edu/lcpc05/papers/lcpc05-paper-42.pdf.

Wu, Sheng-Nan. "Simulations of the Cardiac Action Potential Based on the Hodgkin-Huxley Kinetics with the Use of Microsoft Excel Spreadsheets," 2004 Inst. For Sci. Info.

Zaghloul, Nabil A. "Unsteady Gradually Varied Flow in Circular Pipes with Variable Roughness," IEE,, Mar. 1997.

European Search Report for EP 05105810, mailed Mar. 25, 2008.

Written Opinion of the International Searching Authority and International Search Report in PCT Application No. PCT/US2007/011189, mailed Jan. 4, 2008.

* cited by examiner

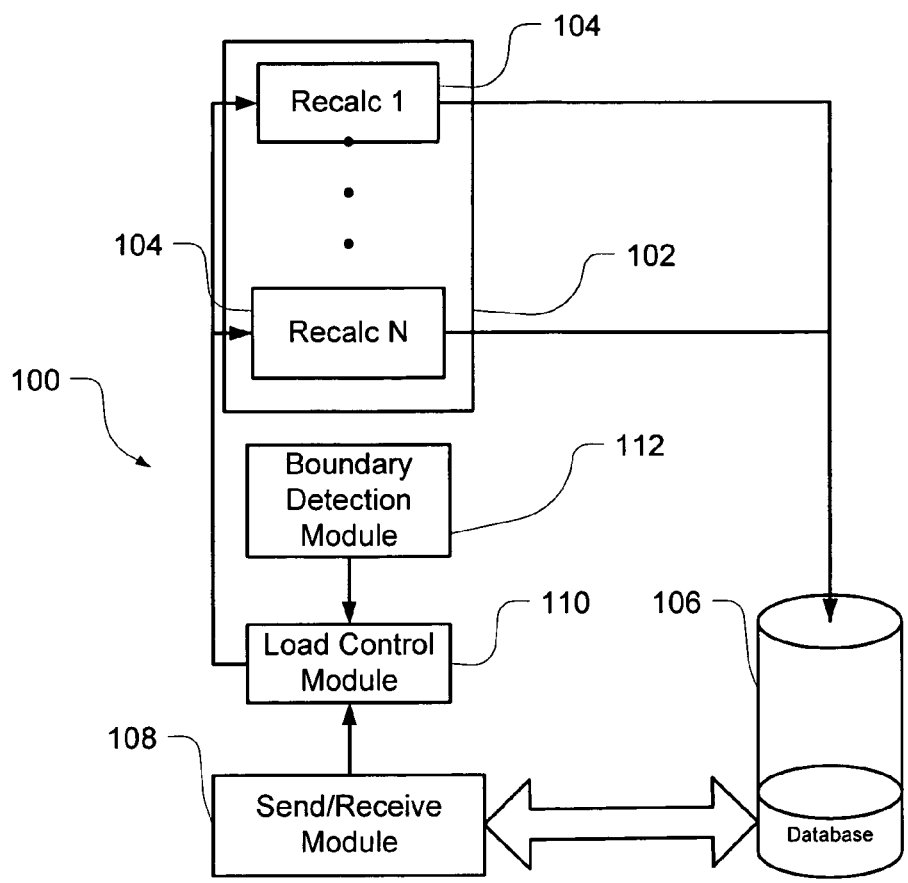
FIG. 1
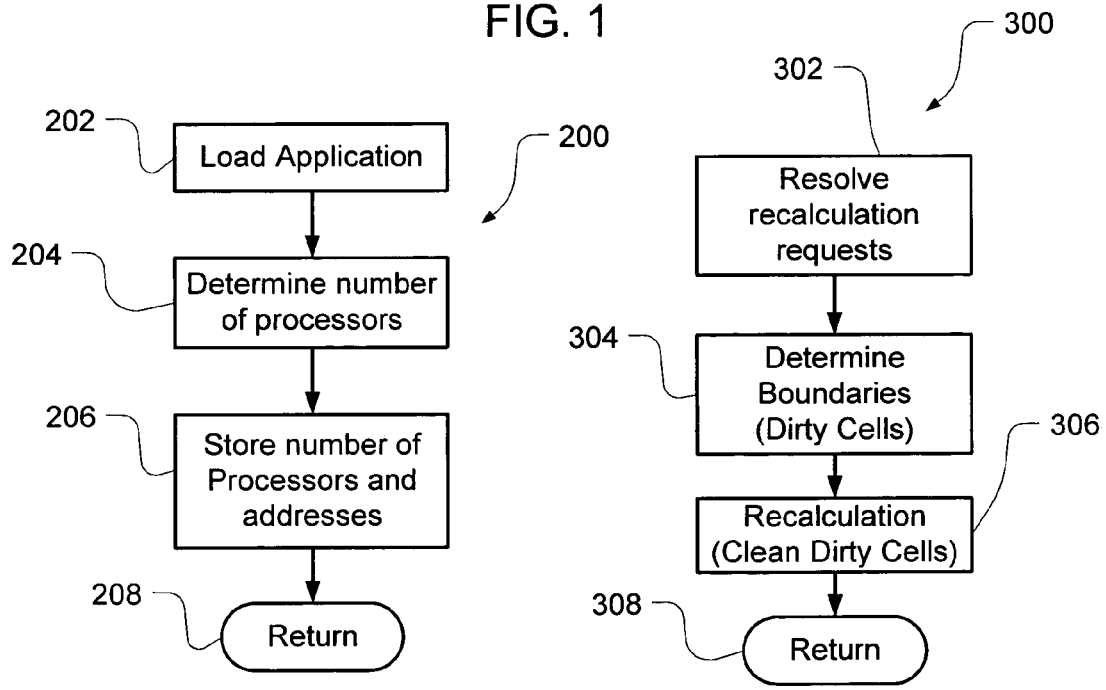
FIG. 2
FIG. 3

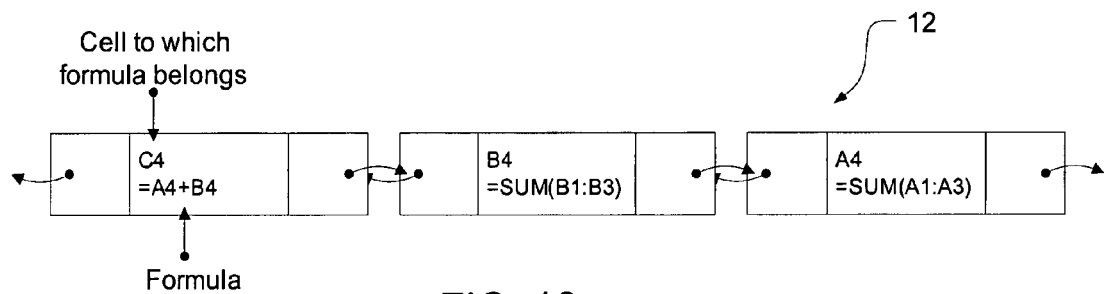
FIG. 15
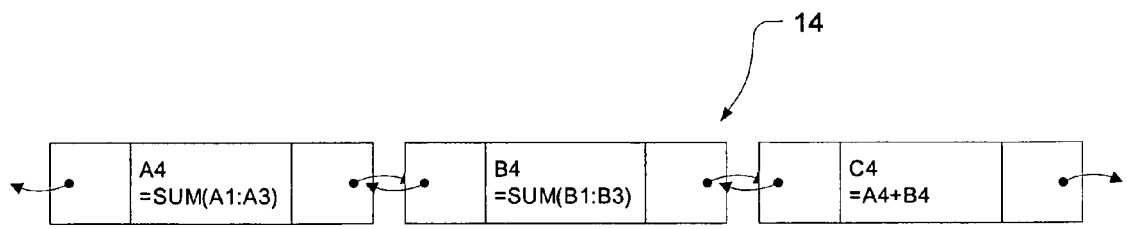
FIG. 16
FIG. 17

METHOD AND SYSTEM FOR MULTITHREAD PROCESSING OF SPREADSHEET CHAIN CALCULATIONS

TECHNICAL FIELD

The present invention relates to spreadsheet calculation processing and more particularly to chain calculations in a spreadsheet program running in a multiprocessor environment.

BACKGROUND OF THE INVENTION

A conventional spreadsheet program such as Microsoft Excel handles calculation and recalculation of formulas within a spreadsheet utilizing a single calc chain, which is essentially an ordered list of all formulas entered into all worksheets currently loaded by Excel. Further, there is a single copy of each variable pertaining to this calc chain. When a formula is entered into a worksheet, the formula is added to the beginning of the global calc chain. When a recalculation (recalc) operation is triggered, either by modifying the contents of cells upon which formulas depend, or by manually requesting a recalc operation, Excel will iterate through the calc chain and recalc any formulas which have been marked as "dirty" (i.e., pending recalc). Thus a single control thread iterates through the single chain of formulas. The calc chain is saved to file with information to preserve its ordering. Then, upon re-loading the spreadsheet and calc chain, the formulas are in their proper order, according to their dependencies, for processing the formulas. This prevents Excel from having to duplicate the work to order the calc chain.

The following scenario illustrates how a conventional spreadsheet program chain calculation routine handles dependencies between formulas. Consider the worksheet 10 shown in FIG. 15. The calc chain 12 for spreadsheet 10 may be represented as in FIG. 16. In this conventional spreadsheet chain 12, the code always evaluates the first cell on the left first. In the case above, the code begins by evaluating the first cell, C4. When trying to evaluate the formula "=A4+B4", the calc code discovers that the formula depends on cell A4, and that cell A4 is "dirty", i.e., is yet to be calculated. In this situation, the formula "=A4+B4" is called the "dependent" formula, and the formula in cell A4 is called a "supporting" formula. The code stops evaluating the formula =A4+B4, pulls the formula for cell A4 out of the calc chain, and re-inserts it immediately before the formula for cell C4. Then, the calc code resumes its work starting at the formula for cell A4. The calc code evaluates A4 with no problem and moves on to C4. When trying to evaluate the formula =A4+B4 (for the second time), the calc code sees that A4 is now calculated (no longer "dirty"), but discovers that the formula also depends on cell B4, and that B4 is also dirty. So, again, the code stops evaluating the formula and moves the formula for B4 immediately before the formula for C4. The code then evaluates B4 with no problem, and moves on to C4 (now for the third time). C4 can now be evaluated, completing the process. The reordered chain 14 is shown in FIG. 17.

This reordered chain 14 is then saved for subsequent recalc operations so that the spreadsheet program does not have to redo this analysis and reordering each time a recalculation is either manually or automatically requested by some change made in the spreadsheet. With extremely complex spreadsheet demands, especially in large financial projection scenarios, there is a substantial amount of processing time required for performing the long chain calculations in the manner described above. Users do not like to wait long for results when changing scenarios in their projections. Thus there is an incentive to reduce this processing time. It is with respect to these and other considerations that the present invention has been made.

SUMMARY OF THE INVENTION

In accordance with the present invention, a spreadsheet program that has a unique capability to utilize multiple processors when available to handle chain calculations solves the above and other problems.

Embodiments of the invention involve a method of processing supporting and dependent formulas in a spreadsheet program. The operations basically include first determining a number of available processors, then allocating a recalculation engine to each available processor, distributing the formulas between the recalculation engines, and then concurrently evaluating the formulas distributed to each recalculation engine when a recalc operation is called for in the spreadsheet program. More particularly, the method of processing a plurality of formulas in a spreadsheet program on an operating computing system having, for example, two processors involves operations of 1) assigning a first recalculation engine to one of the two processors and a second recalculation engine to the other of the two processors, 2) distributing each formula to one of the first and second recalculation engines and 3) in each of the first and second recalculation engines determining whether a first/next formula is a dependent formula, evaluating the first/next formula if the first/next formula is not dependent, or, if the first/next formula is dependent, determining the location of the supporting formula, and, 4) if the supporting formula is in the same recalculation engine, moving the supporting formula ahead of the first/next formula, and evaluating the supporting formula. If the supporting formula is not in the same recalculation engine, making an arrangement with the engine containing the supporting formula for receiving and handling the dependent formula.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

BRIEF DESCRIPTION OF THE DRAWINGS

FIG. 1 illustrates an exemplary modular software system according to an embodiment of the present invention.

FIG. 2 illustrates initial operations that the software according to an embodiment of the present invention completes upon startup.

FIG. 3 is a block diagram of the general overall operations performed in the software in an embodiment of the present invention when a cell value in a spreadsheet is modified.

FIG. 15 is an exemplary conventional spreadsheet.

FIG. 16 is a representation of the calculation chain for the spreadsheet shown in FIG. 15.

FIG. 17 is a representation of the reordered calculation chain for the spreadsheet shown in FIG. 15.

DETAILED DESCRIPTION OF THE INVENTION

Figure 4:
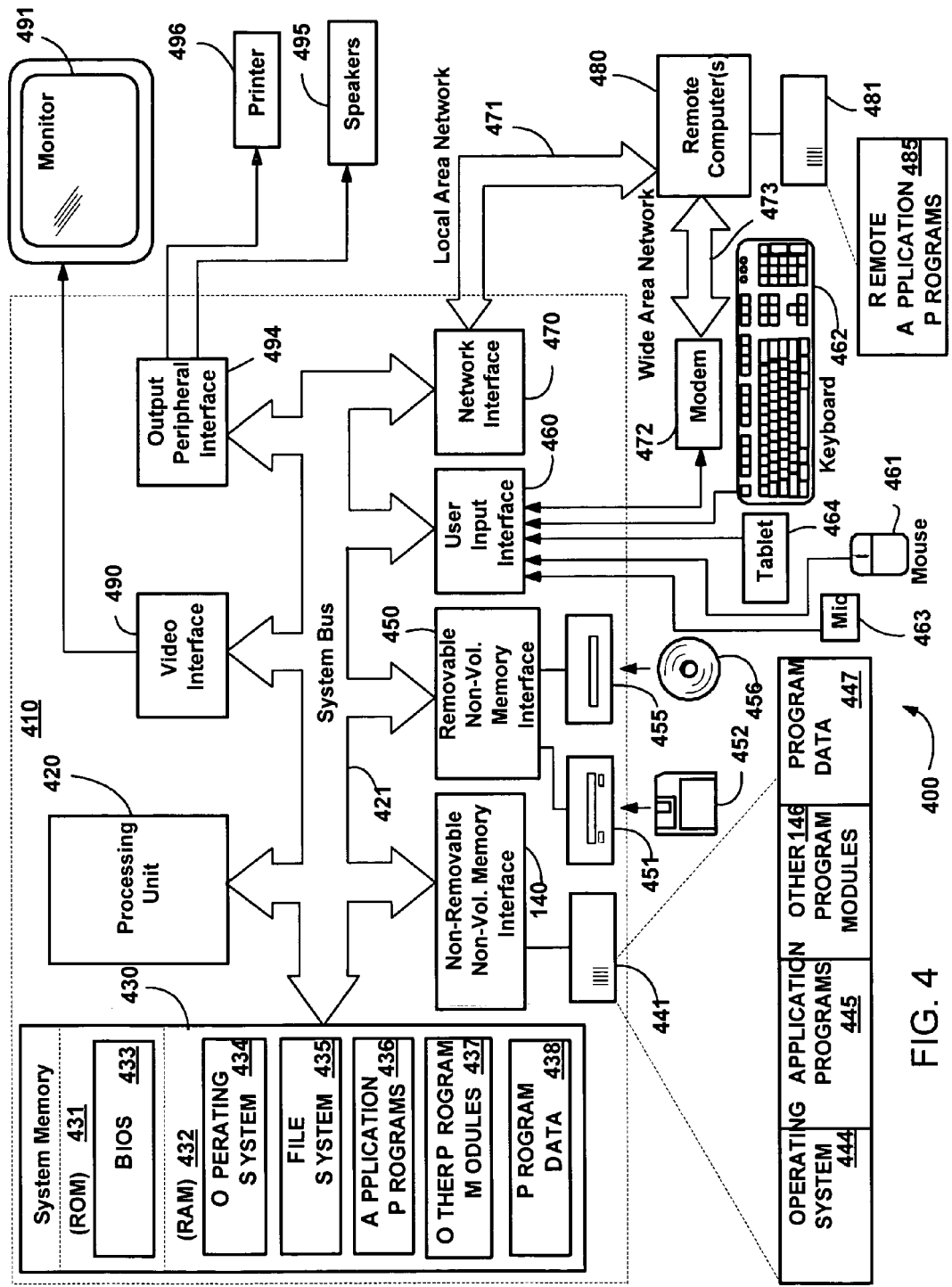
FIG. 4 shows a computer system that may be used according to particular aspects of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In general, the present invention relates to processing spreadsheet recalculations, and in particular to processing chain calculations in multiple concurrent threads when more than one processor or processing engine is available. Referring now to FIG. 1, the functional component modules used in a spreadsheet program are logically illustrated in accordance with an embodiment of the present invention. Basically the system 100 comprises a processing module 102 that includes a number N of available processors in the operating system, each having a recalculation engine 104 operating thereon, a database 106, an I/O or send/receive module 108 operable to receive and transmit data from the database 106, as well as communicate with a load control module 110. The load control module communicates with a boundary detection module 112 that determines the range and domain of dirty cells that must be recalculated in the event a recalculation command is received from the send/receive module 108.

FIGS. 2 and 3 illustrate the basic operations performed by the system 100 shown in FIG. 1. First, an initialization sequence 200 of operations is performed when a spreadsheet application in accordance with the present invention is first loaded or called. Sequence 200 begins in load application operation 202 when the program is initially loaded, for example, on computer system 410. This operation sets the initial information for program operation. Control then transfers to operation 204. In operation 204, the number of available processors in the computer system 410 is determined. These may be separate processors or one or more embedded coprocessors on a single chip, depending on the environment in computer system 410, discussed below. Control then transfers to operation 206.

In operation 206, the number of available processors and their access locations is stored in the database 106 for later retrieval and use. Control then returns in operation 208 to await user specified instructions regarding loading and processing of a particular spreadsheet.

When, in any spreadsheet running on the system 100, a manual or automatic calculation or recalculation request is made to process a chain calculation within the spreadsheet, the operations 300 shown in FIG. 3 are performed. First, in operation 302, the recalculation requests are received by the send/retrieve module 108 and data is retrieved from the database 106 as required by the request. The operation 302 may be triggered by a manual request by a user to recalculate the spreadsheet being displayed or automatically due to a request from a calling routine or when a user changes a value in a cell of the spreadsheet that contains a formula or when a user adds another formula to the spreadsheet. In any case, the recalculation request is identified in operation 302. Control then transfers to operation 304.

In operation 304 the domain and range of the effect of the recalc request is determined. This may involve only one cell or an array of cells that depend on or support the changed cell content. These are termed "dirty" cells. Control then transfers to operation 306, where the methodology of recalculation in accordance with the present invention is carried out. When the recalculation is complete, control transfers to return operation 308, which returns operation to the calling code or user interface.

Methods in accordance with embodiments of the present invention basically involve determining the number of processors available upon startup of the spreadsheet application, distributing the cells and their formulas to the available processors, and then whenever a recalculation request is indicated, either manually or automatically for dirty cells, concurrently evaluating the dirty formulas to "clean" the dirty cells.

In accordance with embodiments of the invention, the methods described herein may be performed on a single, stand-alone computer system but may also be typically performed on multiple computer systems interconnected to form a distributed computer network. An environment 400 for performing spreadsheet calculations as contemplated by the present invention is shown in FIG. 4. The environment 400 has a computer system 410, which is considered the primary computer system. As used herein, a "computer system" shall be construed broadly and is defined as "one or more devices or machines that execute programs for displaying and manipulating text, graphics, symbols, audio, video, and/or numbers."

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet (electronic digitizer) 464, a microphone 463, a keyboard 462 and pointing device 461, commonly referred to as mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel 493 or the like that can input digitized input such as handwriting into the computer system 410 via an interface, such as a touch-screen interface 492. Note that the monitor and/or touch screen panel can be physically coupled to a housing in which the computing device 410 is incorporated, such as in a tablet-type personal computer, wherein the touch screen panel 493 essentially serves as the tablet 464. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
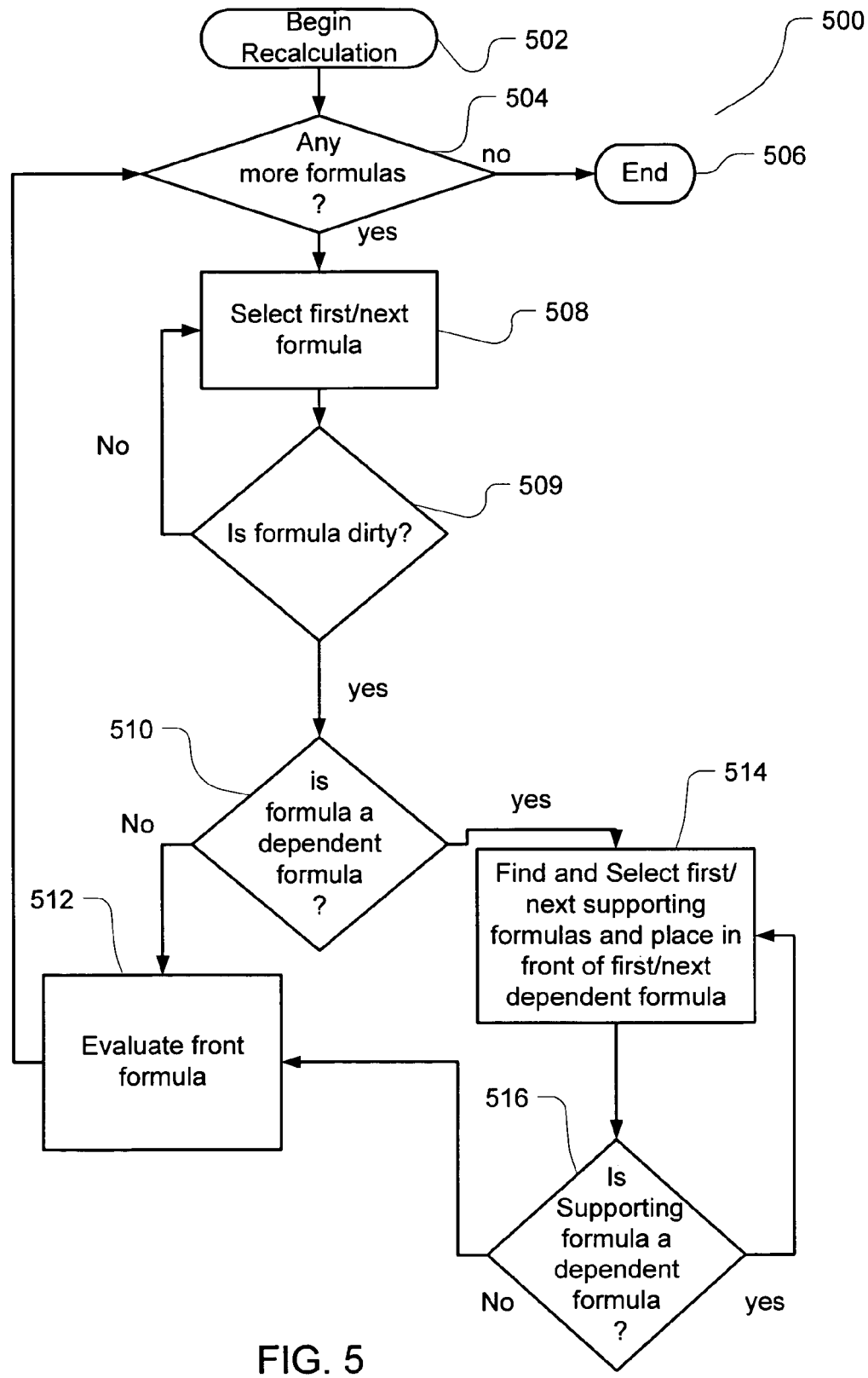
FIG. 5 is a block diagram illustrating basic operations for evaluating formulas in a chain recalculation according a particular embodiment of the present invention.

FIG. 5 is a process flow diagram of the basic operations 500 that occur when a recalculation request is received. The recalculation begins in operation 502. Control transfers to operation 504 which queries whether there are any dirty formulas involved in the cells to which the recalculation request pertains. If there are none, control transfers to end operation 506 where the recalculation request terminates. If there are cells that contain formulas, control transfers to operation 508, in which the first formula in the chain is selected. Control then transfers to operation 509.

Query operation 509 asks whether the first/next formula is a dirty formula, i.e., one that needs recalculating. If not, control transfers back to operation 508 to select the next formula. If the formula in operation 509 is dirty, control transfers from query operation 509 to query operation 510 which determines if the formula is a dependent formula.

Query operation 510 asks whether the first/next formula is a dependent formula, i.e., one in which a variable depends upon one or more variables not present in that cell. If not, control transfers to operation 512. If the formula in operation 510 is dependent on another formula i.e., a supporting formula, control transfers from operation 510 to operation 514 which grabs the supporting formula and places it in front of the dependent formula. Control then passes to query operation 516.

Query operation 516 attempts to evaluate the supporting formula immediately. As part of this evaluation, operation 516 asks whether this supporting formula itself is a dependent formula. If it is not, then control transfers to operation 512 where the supporting formula is evaluated and then the dependent formula is evaluated. Then control passes back to operation 504, which asks whether there is another formula in the chain to be recalculated.

In query operation 516, if the answer is yes, the first supporting formula is itself a dependent formula, control reverts back to operation 514 which determines the next, i.e. second, supporting formula and places it in front of the first supporting formula. Control then transfers again to query operation 516. Again, query operation 516 asks whether the new (the second) supporting formula is itself a dependent formula. If so, control returns again to operation 514 where the next supporting formula is retrieved and placed ahead of the previous supporting formula. This process repeats until there are no more supporting formulas are found that are dependent formulas. Control then transfers from query operation 516 to operation 512, in which the second supporting formula is evaluated, the first supporting formula is evaluated, and finally the dependent formula is evaluated in operation 512. Control then passes back to operation 504 and the above-described process is repeated until there are no more formulas. The recalculation process then terminates in operation 506.

Each recalculation engine 104 that is available to be used by the spreadsheet program receives and handles a portion of the calculation chain to be processed in a similar manner to that just described above. When a recalculation request is received in operation 302 and the range and domain of affected cells having dependent and/or supporting formulas is determined in operation 304, the database 106 provides the cell information via the send/receive module 108 to the load control module 110. Armed with input from the boundary detection module 112, it is the load control module's task to distribute the affected cells to the available recalc engines 104 for processing. For example, if there are two processors available, then two recalc engines 104 will be available, one on each processor. The load control module 110 distributes the formulas in the chain preferably equally between the available processors 102. One method of choosing which engine to assign is to randomly pick the recalc engine 104 to which each cell and its formula are assigned. This may be done by attaching a flag to each cell that corresponds to the engine assigned to that cell by the load control module random number generator. In theory, such a random placement will equalize the load on each recalc engine in the long run. Alternatively, the reassignment may be simply numerically distributed, i.e., with the first formula going to the first engine, the second going to the second, the third going to the third, etc. and then repeating when the number of processors is exhausted.

In a multiprocessor environment as in the present invention, the recalc engine operations constitute separate parallel threads processing the recalculation of variables. Since the loading of cells within the recalc engines is preferably random, the load on each thread will generally be balanced as a result of random placement. The load control module also monitors the loading of the several recalc engines and can re-allocate cells between the engines. Alternatively the load control module can be biased toward one engine or another as desired by the user or automatically in order to balance the computational requirements of the particular chain.

The manipulation of formulas and data within the formulas by parallel processor operations could result in unintended consequences that may invalidate a result. For example, two different threads may compete for access to an individual cell or change the data stored in a common cell. For this reason, there is provided in embodiments of the present invention a series of rules that apply to each and every data manipulation carried out by the various recalc engines, in order to prevent such unintended consequences.

The following software rules apply to the method of evaluation carried out by each of the available Recalculation Engines. In the examples discussed further in this specification below, two recalc engines are utilized, but only as exemplary, in order to illustrate operation of these rules.

These general rules are:

1. Only an owner Recalculation Engine can modify items (formulas and their placement) in its Recalculation chain.

2. Both the owner Recalculation Engine and other Recalculation Engine(s) can modify items on a Recalculation Engine Extra Chain.

3. Locking prevents simultaneous modification of an item on any extra chain. For example, if Recalculation Engine 1 wants to move a formula to Recalculation Engine 2, it first must request a lock for Recalculation Engine 2's Extra Chain.

4. Once it has the lock, it sets the cell's "Extra" value to TRUE, sets the cell's Engine value from Recalculation Engine 1 to Recalculation Engine 2, moves the formula to the other engine, Recalculation Engine 2, and releases the lock.

5. In the mean time, Recalculation Engine 2 may want to pull a cell formula off it's own Recalculation Engine Extra Chain. However, if its Recalculation Engine Extra Chain is locked, it must wait until unlocked prior to such a move.

Figure 6:
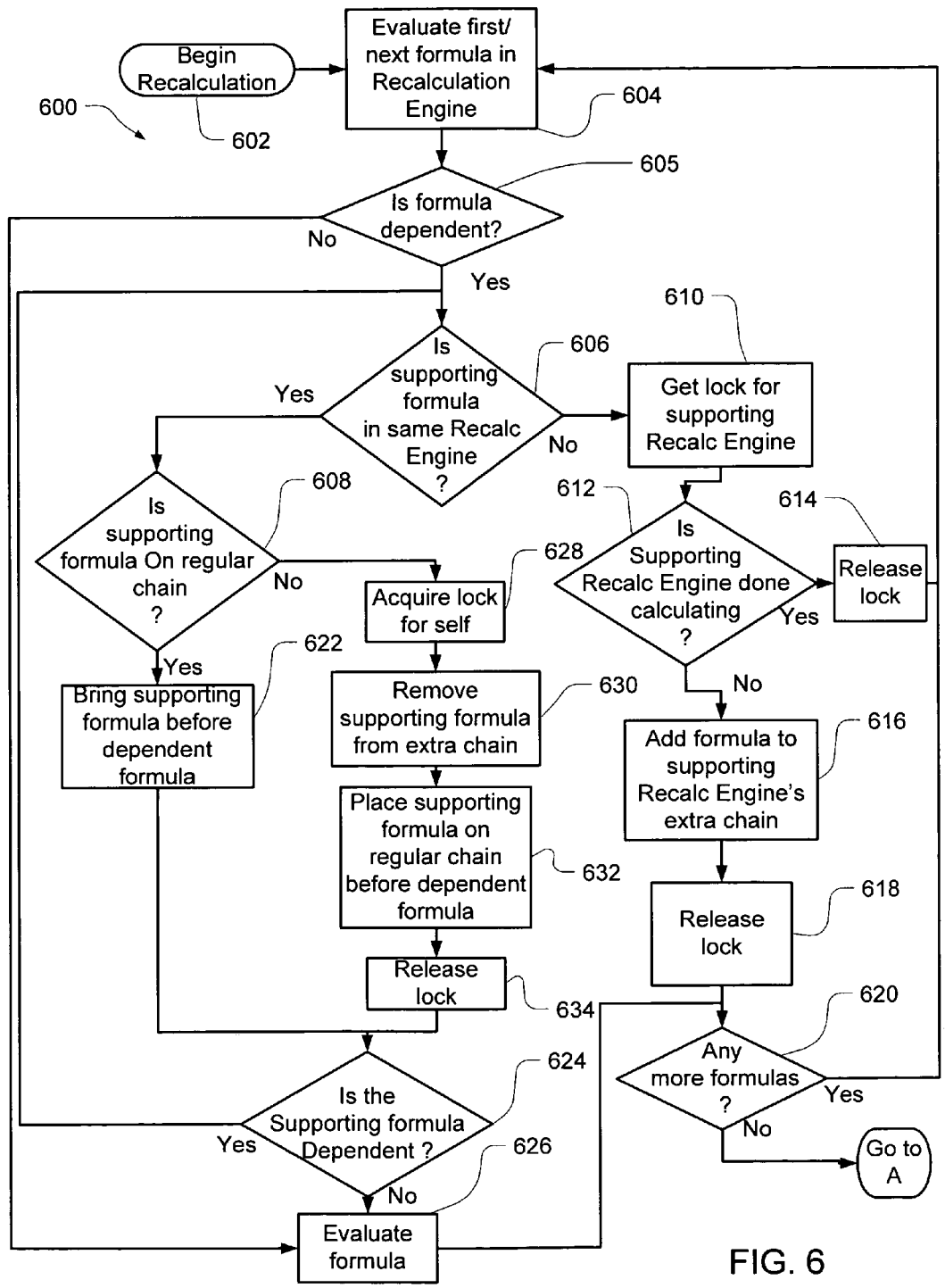
FIG. 6 is a detailed flow diagram of operations in a multi-thread recalculation engine according to an embodiment of the present invention.

FIG. 6 is a detailed flow diagram 600 of the operations carried out by each recalculation engine in an exemplary embodiment of the present invention. It is to be understood that variations in the sequence of individual operations may be made. The following description is of one embodiment only. All such variations as will be readily apparent to one skilled in the art are incorporated herein.

Operation begins in operation 602. Here each recalculation engine 104 is initialized and receipt of formulas begins. When the load control module 110 signals to the recalculation engines that the formulas for a recalculation operation have all been distributed, control transfers to operation 604.

In operation 604 the first formula in the recalculation engine 104 is marked to be evaluated. Control transfers to query operation 605 which asks whether the formula is a dependent formula. If there are simply constant or previously determined variables in or referenced in the formula, then control is transferred to operation 626, and the formula is simply evaluated and then the next formula in sequence is evaluated in the same way until all formulas in the chain in the recalculation engine are evaluated. However, if any one of the formulas, as encountered, is a dependent formula, i.e., it refers to another dirty formula, called a supporting formula, evaluation stops and control transfers to query operation 606.

Query operation 606 asks whether the supporting formula is located on the same recalc engine or on another recalc engine. If the supporting formula in the dependent formula under examination is found on the same recalc engine, control transfers to query operation 608. If the supporting formula in the dependent formula under examination is not on the same recalc engine, control transfers to operation 610.

In operation 610 a lock request is sent to the recalc engine on which the supporting formula resides, and, when a lock is established, control transfers to query operation 612. Query operation 612 determines whether the recalc engine containing the supporting formula is currently processing or has completed its calculations. If the supporting recalc engine is idle, having completed its calculations prior to receipt of the lock request and issuing a lock to operation 610, the lock is released and control transfers back to operation 604 to retry evaluating the dependent formula. On the other hand, if the supporting recalc engine is busy calculating, the answer to query operation 612 is no, and control transfers to operation 616.

In operation 616, the dependent formula is moved from the recalc engine and placed in an extra chain appended to the supporting recalc engine's normal calc chain. Control then transfers to operation 618 where the lock on the supporting recalc engine is released. Control then transfers to query operation 620.

Figures 7, 8:
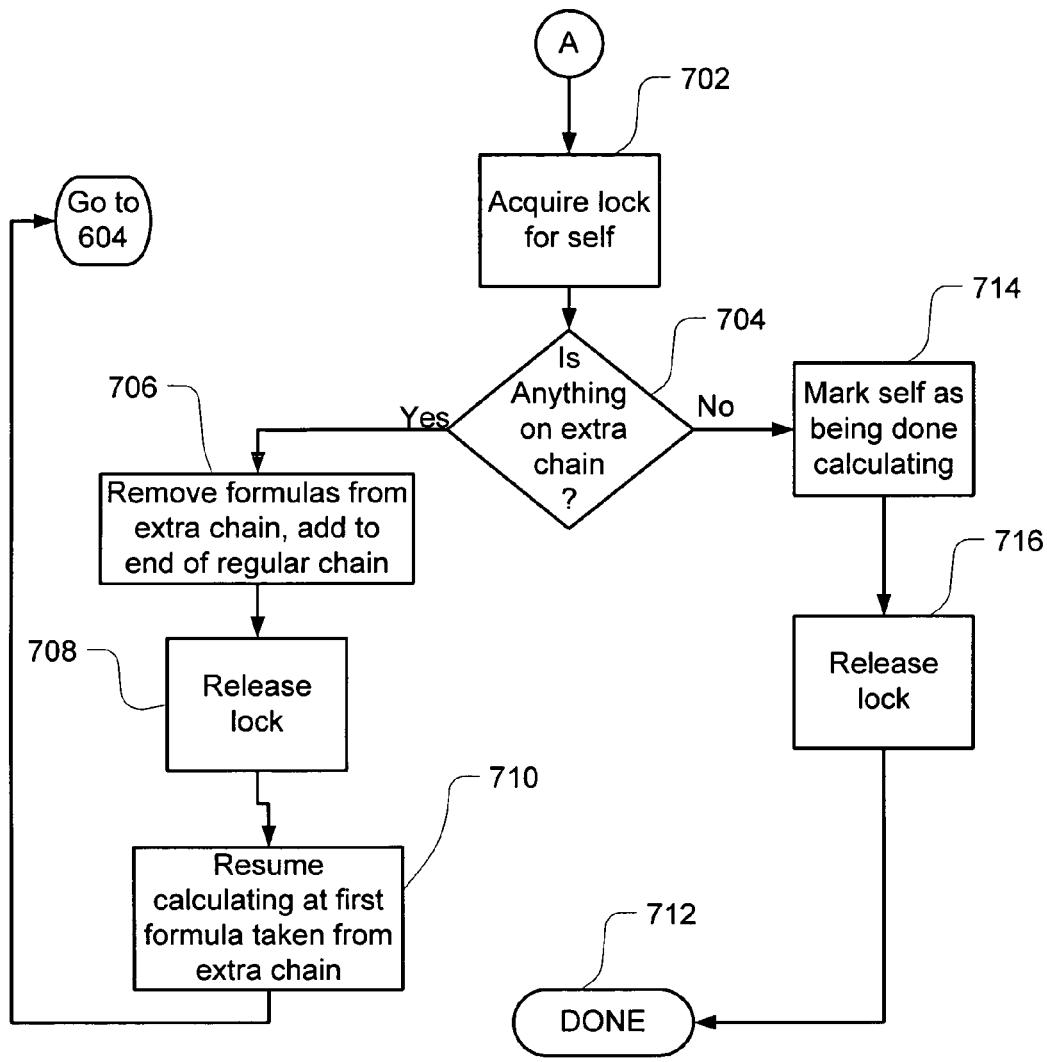
FIG. 7 is a flow diagram illustrating operations for handling formulas on an extra chain in the recalculation engine of FIG. 6.
FIG. 8 is an exemplary 3×3 spreadsheet showing a number of formulas.

In query operation 620 the question is asked whether the initial recalc engine has any more formulas in its normal calc chain that require evaluation. If the answer is yes, then control transfers back to operation 604 where the next formula in the normal calc chain is examined and evaluated. On the other hand, if there are no more formulas in the normal chain of the initial recalc engine to be evaluated, then control transfers to a routine 700 for evaluation of the initial recalc engine's extra chain, which is shown in FIG. 7. Thus control would transfer to operation 702 in which a lock is requested and acquired for the recalc engine's own extra chain. This ensures that no values or formulas on the recalc engine's own extra chain are modified while the lock is active. Once a lock is acquired, control transfers to query operation 704.

In query operation 704, the query is made whether there is any formula on the extra chain. If there is a formula on the extra chain, control transfers to operation 706. Operation 706 removes all the formulas from the recalc engine's extra chain and places them in sequence on that engine's normal chain. Control then transfers to operation 708, in which the self lock is released. Control then passes to operation 710.

In operation 710, recalculations are resumed starting in 604 for the formulas now on the normal chain. Evaluation of the formulas starts with the first formula taken from the extra chain and proceeds sequentially through all the formulas on the normal chain until all formulas have been evaluated as described above.

If the answer in query operation 704 is no, there are no formulas on the engine's extra chain, then control passes to operation 714. Here the recalc engine labels itself done with calculations and transfers control to operation 716 where the self lock on the recalc engine is released. Control then passes to operation 712 which provides a status that calculations and evaluations are complete for this recalc engine. Once all recalc engines provide a status that calculations and evaluations are complete, then recalc as a whole is complete.

Back in query operation 606, if the determination is made that the first formula in the recalculation engine has a supporting formula and the supporting formula is in fact in the same recalc engine, control transfers to query operation 608. In query operation 608, the question is asked whether this supporting formula is on the normal, i.e., regular chain in the recalculation engine, or if it is not, it will be on the recalc engine's extra chain. If the supporting formula is on the recalc engine's normal chain, control passes to operation 622. Here the supporting formula is simply moved from its location in the chain to immediately preceding the dependent formula and immediately evaluated. Control then passes to query operation 624.

In query operation 624, this supporting formula is first examined to determine whether it is itself a dependent formula. If it is a dependent formula, control then returns to query operation 606 to examine the supporting formula for this supporting formula. The operational flow continues from operation 606 as previously described.

On the other hand, if the answer in query operation 624 is no, the supporting formula is not a dependent formula, control passes to operation 626 where the formula is directly evaluated. Following evaluation in operation 626, control passes again to query operation 620 which asks whether there are any more formulas on the normal chain of the recalc engine. If there are no remaining formulas on the normal chain, control passes to operational routine 700 as discussed above. If there are additional formulas on the normal chain in the recalc engine, control returns to operation 604 where the next formula in the normal chain is evaluated.

If the answer in query operation 608 is no, the supporting formula is not on the normal chain in the recalculation engine, then it must be on the engine's extra chain. Therefore control passes to operation 628 where a self lock request is issued. When a self lock is established, control passes to operation 630. In operation 630, the supporting formula is removed from the extra chain. Control then transfers to operation 632. In operation 632, the supporting formula just removed is placed in the normal chain of the recalc engine immediately ahead of the calling dependent formula. Control then transfers to operation 634. In operation 634, the self lock is released and control transfers to query operation 624 described above.

Several examples of how this process is performed on a simple 3×3 spreadsheet 800 shown in FIG. 8 are illustrated in FIGS. 9 through 14.

Figure 9:
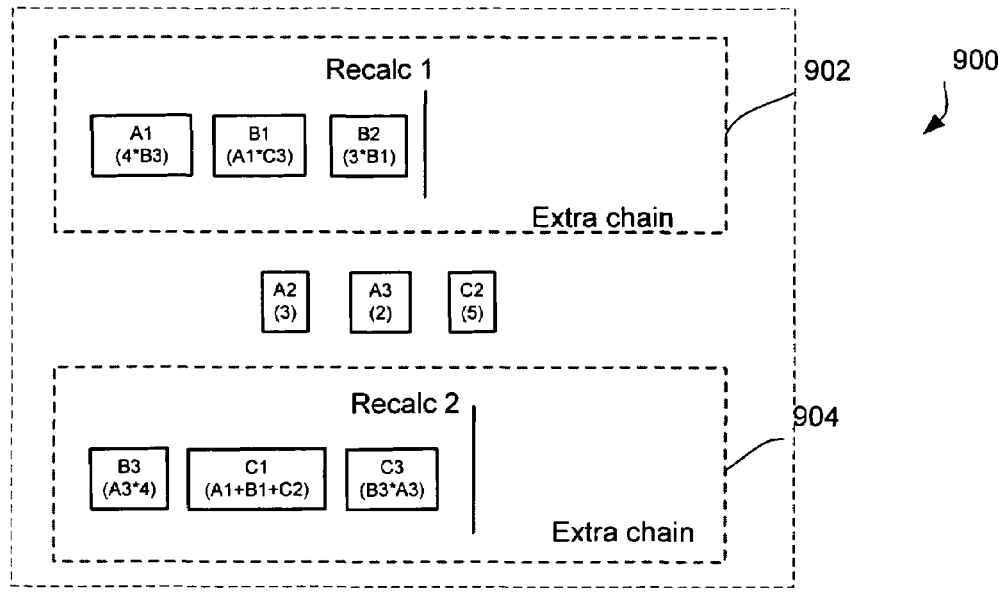
FIG. 9 illustrates the cells shown in FIG. 8 as initially loaded into two recalculation engines operating in accordance with an embodiment of the present invention.
Figure 10:
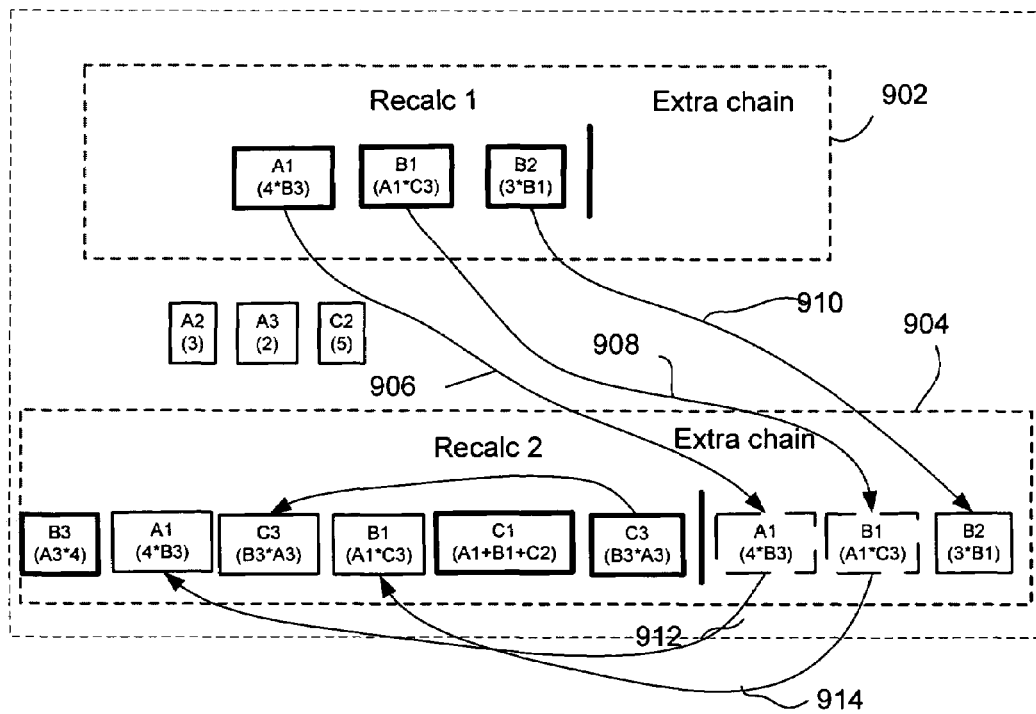
FIG. 10 illustrates the processing of the formulas in recalculation engines 1 and 2 shown in FIG. 9.
Figure 11:
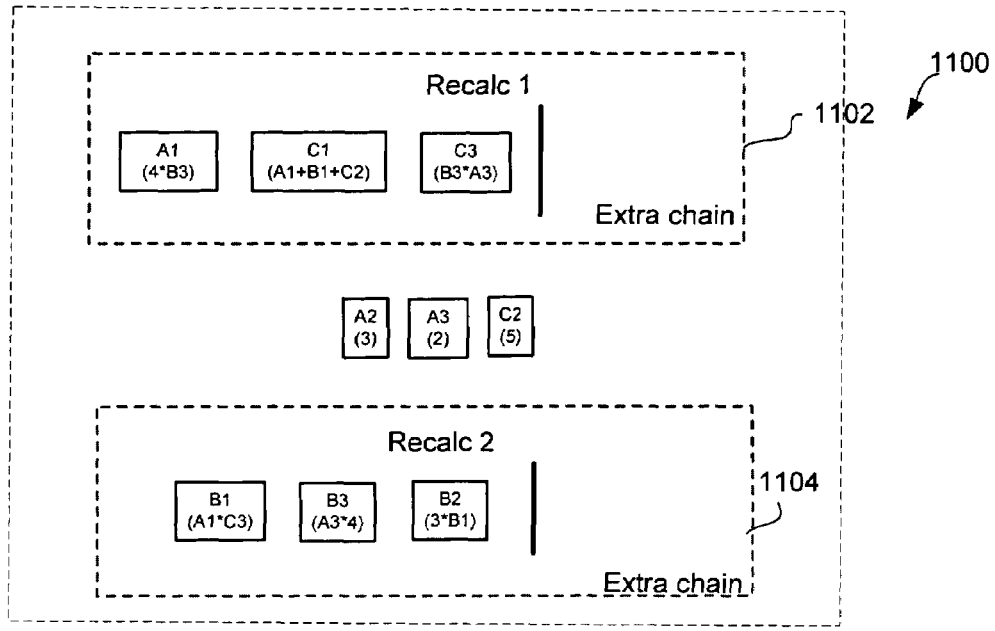
FIG. 11 illustrates the cells shown in FIG. 8 as initially loaded into two recalculation engines operating in accordance with an embodiment of the present invention.
Figure 12:
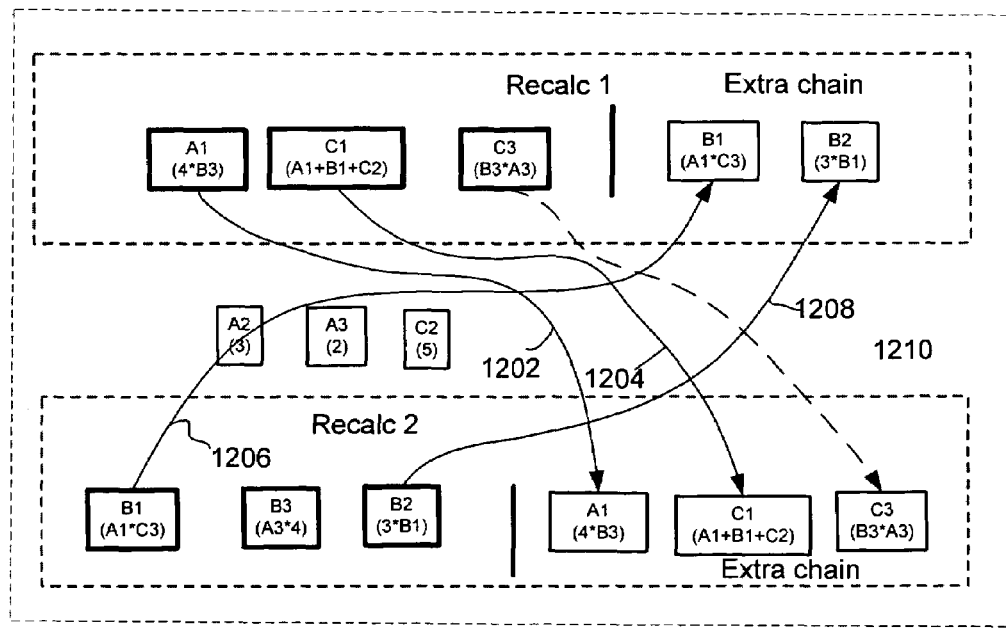
FIG. 12 illustrates the processing of the formulas in recalculation engines 1 and 2 shown in FIG. 11.
Figure 13:
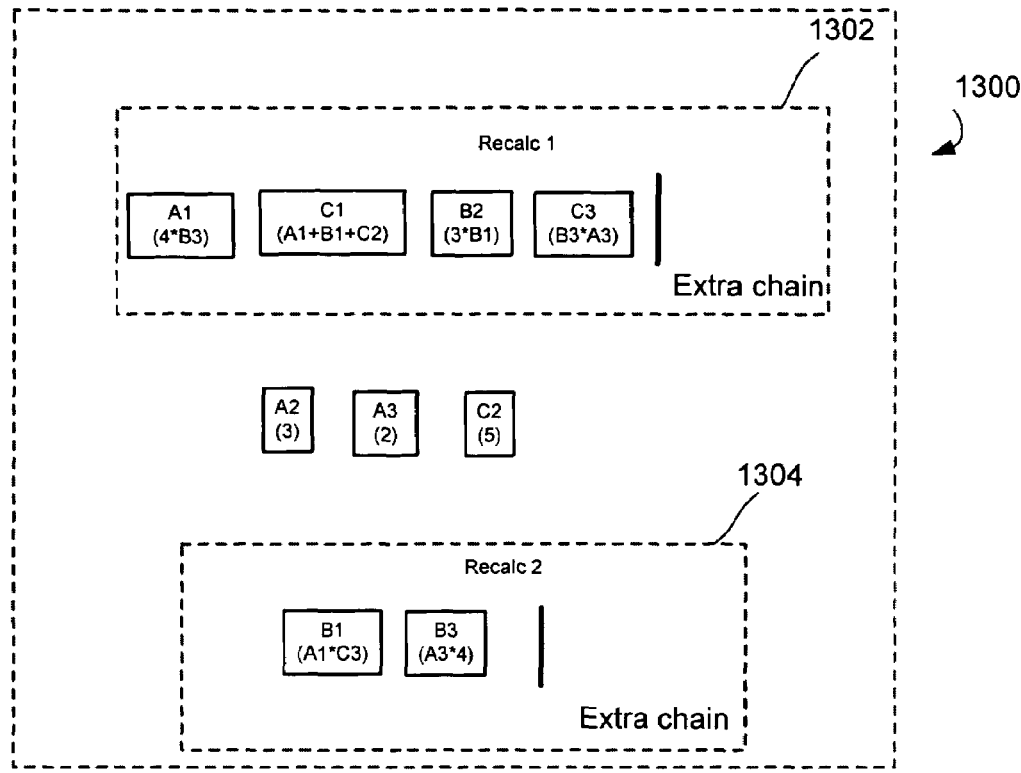
FIG. 13 illustrates a still further example of the cells shown in FIG. 8 as initially loaded into two recalculation engines operating in accordance with an embodiment of the present invention.
Figure 14:
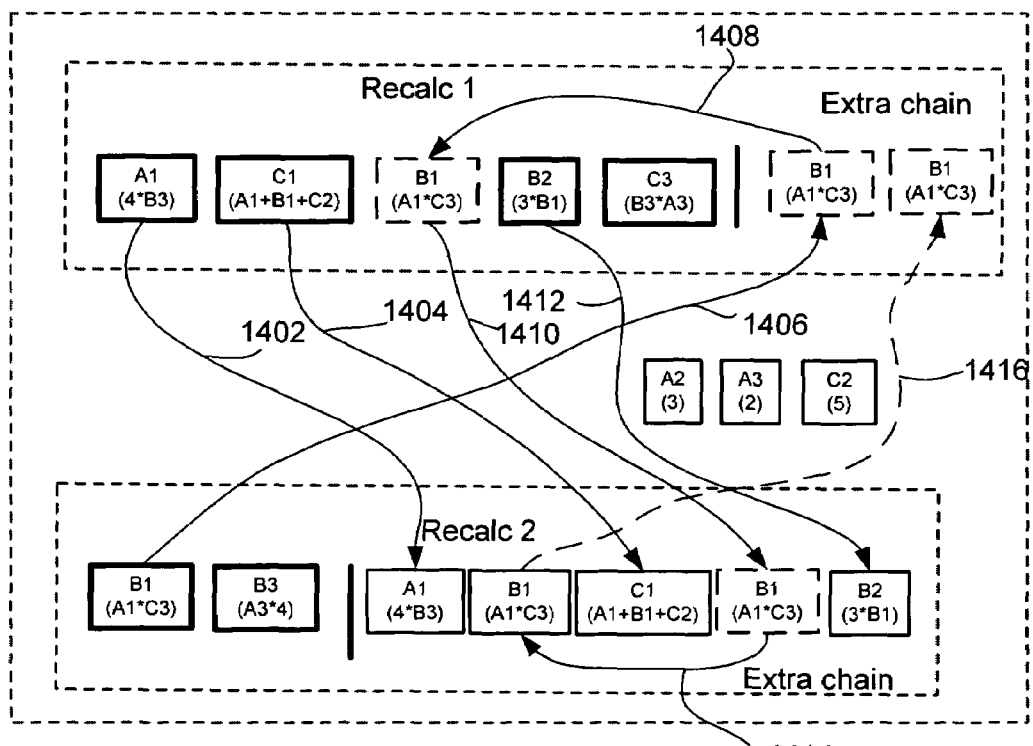
FIG. 14 illustrates the processing of the formulas in recalculation engines 1 and 2 shown in FIG. 13.

FIGS. 9 and 10 illustrate a first example in which the formulas of the exemplary spreadsheet 800 shown in FIG. 8 are processed in accordance with the method of the present invention described above. FIGS. 11 and 12 illustrate a second example of the same method with a different loading of formulas shown in FIG. 8. FIGS. 13 and 14 illustrate a third example with another different loading of the same formulas shown in FIG. 8.

FIG. 9 illustrates an exemplary loading of the formulas into two engines, Recalc Engines 1 and 2, indicated as engine 902 and 904 respectively, in a spreadsheet program operating on a system 900 with two processors as a result of a random distributed loading of the formulas in the spreadsheet of FIG. 8 at a point in time prior to any formula evaluation. Each engine 902 and 904 has a normal chain of formulas and an empty extra chain at this point in time. Recalc Engine 1 holds the formulas of cells A1, B1, and B2. The constants in cells A2, A3, and C2 are not loaded into the Recalc Engine 1, but are available for evaluation from both Recalc Engines 1 and 2 during processing. Recalc Engine 2 holds the formulas in cells B3, C1 and C3 at this time.

Each item, or cell formula, in each engine is evaluated, as illustrated, starting from the left, and proceeds to the right in FIGS. 9 and 10. Further, the evaluations are done independently, concurrently and sequentially within each engine.

First, Recalculation engine 1 attempts to evaluate item A1, the formula =4*B3. However, the formula in cell B3 is not in Recalculation Engine 1 and has not yet been evaluated. Since B3 is in Recalculation Engine 2, the Recalculation Engine 1 obtains a lock on Engine 2's Extra Chain and item A1 is moved to the Extra Chain of Recalculation Engine 2. This is shown in FIG. 10 by the arrow 906 illustrating this movement. The lock is then removed. Control in Engine 1 then transfers to evaluate the next item, cell B1. Cell B1 contains the formula "=A1*C3". Item A1 has not been evaluated and now resides on Recalculation Engine 2. Accordingly, a lock request is issued again to Recalculation Engine 2's Extra Chain, and when received and lock established, item B1 is moved to the Extra Chain of Recalculation Engine 2 and placed after item A1. This is shown in FIG. 10 by the arrow 908.

Control in Engine 1 then transfers to evaluate the next item, cell B2. Cell B2 contains the formula "=3*B1". Item B1 has not been evaluated and now resides on Recalculation Engine 2. Accordingly, a lock request is issued again to Recalculation Engine 2's Extra Chain, and when received and lock established, item B1 is moved to the Extra Chain of Recalculation Engine 2 and placed after item B13. This is shown in FIG. 10 by the arrow 910.

Concurrently with the first of the above operations in Recalculation Engine 1, Recalculation Engine 2 begins to evaluate item B3, the formula "=A3*4". Item B3 contains A3, which is a constant 2 and thus is not a dependent formula. Accordingly, the calculation is immediately completed and the engine 2 advances to evaluation of the formula in C1. Cell C1 contains the formula "=A1+B1+C2". This formula is dependent. Therefore the engine 2 determines where the supporting formula of A1 is located. It is on Engine 2's extra chain. Therefore a self lock request is issued, and when established, the formula is moved from the extra chain to a process position immediately before the formula in cell C1 as shown by arrow 912. Since cell A1's formula is no longer on Engine 2's extra chain, its intermediate location is indicated by the dashed rectangle. The Engine 2 then evaluates the formula =4*B3 and then moves back to the formula =A1+B1+C2. The Engine 2 stops at the formula in cell B1. This formula is a supporting formula found on Recalc Engine 2's extra chain. Therefore a self lock request is again issued, and, when established, the formula =A1*C3 is moved to the normal chain ahead of the formula in cell C1, as indicated by arrow 914. The Engine 2 evaluates the formula in B1 and sees that while A1 has been calculated, C3 is a supporting formula that needs to be calculated. Therefore a self lock request is issued, and, when established, the formula in C3 is moved to the normal chain, directly ahead of B1. The Engine 2 now evaluates the formula in C3. Thus the formula in C3 is immediately calculated. Next the Engine 2 immediately calculates the formula in B1, because A1 and C3 are now calculated. Now, all elements of the formula =A1+B1+C2 are known and thus the formula in cell C1 is evaluated. This completes the processing of the normal chain in Recalc Engine 2.

Engine 2 then moves to look at its extra chain. The extra chain contains one formula, =3*B1 in cell B2. A self lock is established on the Recalc 2 chains and this formula is moved from the extra chain to the normal chain in Recalc Engine 2. No arrow is shown indicating the relocation to the normal chain as it would only complicate a complicated figure. Since the formula in cell B1 has now been calculated, it is known, thus the formula in cell B1 is immediately evaluated and calculation completed. Engine 2 sees that it has no more calculations on its normal and extra chains, so sets itself to a status of done.

Engine 1 sees that it has no more calculations on its normal and extra chains, so sets itself to a status of done. This completes the processing in both Engines 1 and 2.

FIGS. 11 and 12 illustrate a second example in which a different exemplary loading of the formulas into Recalc Engines 1 and 2, in operation on processors 1102 and 1104 in a system 1100 occur as a result of a different random distributed loading of the formulas in the spreadsheet of FIG. 8 at a point in time prior to any formula evaluation. Recalc Engine 1 holds the formulas of cells A1, C1 and C3. The constants in cells A2, A3, and C2 are again not loaded into the Recalc Engine 1, but are available for evaluation from both Recalc Engines 1 and 2 during processing. Recalc Engine 2 holds the formulas in cells B1, B3 and B2 at this time.

Each item, or cell formula, in each engine is evaluated, as illustrated, starting from the left, and proceeds to the right in FIGS. 11 and 12. Further, the evaluations are done concurrently and sequentially within each engine.

First, Recalculation Engine 1 attempts to evaluate item A1, the formula "=4*B3". However, the formula in cell B3 is not in Recalculation Engine 1 and has not yet been evaluated. Since the formula in cell B3 is in Recalculation Engine 2, the Recalculation Engine 1 obtains a lock on Engine 2's Extra Chain and item A1 is moved to the Extra Chain of Recalculation Engine 2 as indicated by arrow 1202. The lock is removed. Control in Engine 1 then transfers to evaluate the next item, the formula in cell C1. Cell C1 contains the formula =A1+B1+C2. Item A1 has not been evaluated and now resides on Recalculation Engine 2. Accordingly, a lock request is issued again to Recalculation Engine 2's Extra Chain, and when received, item C1 is moved to the Extra Chain of Recalculation Engine 2 and placed after item A1, as indicated by arrow 1204.

Concurrently with the first of the above operations in Recalculation Engine 1, Recalculation Engine 2 attempts to evaluate item B1, the formula =A*C3. However, item B1 contains A1. The software then determines whether A1 is on Recalculation Engine 2 or Recalculation Engine 1. A1 is likely on Recalculation Engine 1 at this point in time since the engines operate in parallel. Therefore item B1 is moved to the Extra Chain in Recalculation Engine 1 after first obtaining a lock on the Recalculation Engine 1's Extra Chain, as indicated by the arrow 1206. Upon transfer, the lock is removed. Control in Recalculation Engine 2 then moves to evaluate the formula in cell B3. Cell B3 has the formula =A3\*4. Since the cell A3 contains the constant 2, the formula in cell B3 is not dependent and thus is immediately evaluated to be "8", and control then shifts to evaluate the formula in cell B2. At this same time, it is likely that the formula in cell C1 is being transferred from Recalculation Engine 1 to the Extra Chain of Recalculation Engine 2. The formula in cell B2 is "=3*B1". The formula in cell B1 was transferred to the extra chain of Recalc Engine 1. Consequently, the formula in cell B2 is now transferred to the extra chain in Recalc Engine 1 also, as indicated by the arrow 1208.

Recalculation Engine 2 then locks itself and moves all formulas currently on its Extra Chain to its normal chain for processing (not shown in FIG. 12 for simplicity sake). Now the next formula to be calculated is in A1 (=4*B3). B3 has been "cleaned" as it has been previously evaluated to be "8". Therefore item A1 is immediately evaluated and becomes "32".

At the same time that Recalculation Engine 2 is calculating B3, Recalculation Engine 1 is evaluating the formula in cell C3. This dependent formula is =B3\*A3. B3 is the supporting formula. It is possible that the evaluation of B3 may already be completed, and thus the formula can be immediately evaluated. However, if not, the formula in cell C3 would be transferred to the extra chain of Recalc Engine 2, as shown by the dashed arrow 1210. The reader should understand that such a transfer depends entirely on the processing time involved between the two engines.

Continuing on with Recalculation Engine 2, since item B3 has been calculated and item A1 has been calculated, the next formula, C1 is attempted to be evaluated. The formula in cell C1 is a dependent formula, depending on supporting formula B1 and constant C2 and evaluated item A1. Item B1 is now in the extra chain of Recalculation Engine 1. It is likely that in Recalc Engine 1, the two formulas in cells B1 and B2 residing in the extra chain, will now have been moved to the normal chain and calculation begun (not shown in the diagram for simplicity). If the formula in cell B1 has been calculated, the formula in cell C1 will be immediately calculated. If not, a lock would be requested for the extra chain of Engine 1 and the formula in cell C1 would be moved back to Recalc Engine 1 extra chain to await processing. This operation is not shown with an arrow for the sake of simplicity. Again, control in Engine 2 would then proceed to evaluate the formula in cell C3. B3 will have been calculated at this point and A3 is a constant, and thus the formula in cell C3 will be immediately calculated. Engine 2 sees that it has no more calculations on its normal and extra chains, so sets itself to a status of done. This completes the operations in Recalc Engine 2.

Finally back in Recalc Engine 1, a self lock is requested, the formulas in the extra chain are moved to the normal chain, the lock is released, and the formulas are evaluated. The formula in cell B1, =A1\*C3, will be immediately calculated since the formula in cell A1 has been determined and the formula in C3 has been determined. Control then moves to the formula in cell B2. Since the value in cell B1 has just been determined, the value of the formula in cell B2 is immediately calculated. Engine 1 sees that it has no more calculations on its normal and extra chains, so sets itself to a status of done. This completes the operations in Recalc chain 1. This completes the operations in this example.

FIGS. 13 and 14 illustrate a third example in which the formulas of the exemplary spreadsheet shown in FIG. 8 are processed in accordance with the method of the present invention described above. FIG. 13 illustrates an exemplary loading 1300 of the formulas into Recalc Engines 1 and 2 as a result of a random distributed loading of the formulas in the spreadsheet of FIG. 8 at a point in time prior to any formula evaluation. Recalc Engine 1 on processor 1302 holds the formulas of cells A1, C1, B2, and C3. The constants in cells A2, A3, and C2 are not loaded into the Recalc Engine 1, but are available for evaluation from both Recalc Engines 1 and 2 during processing. Recalc Engine 2 holds the formulas in cells B1 and B3 on processor 1304 at this time.

Each item, or cell formula, in each engine is evaluated, as illustrated, starting from the left, and proceeds to the right in FIGS. 13 and 14. Further, the evaluations are done concurrently and sequentially within each engine.

First, Recalculation engine 1 attempts to evaluate item A1, the formula =4*B3. However, the formula in cell B3 is not in Recalculation Engine 1 and has not yet been evaluated. Since B3 is in Recalculation Engine 2, the Recalculation Engine 1 obtains a lock on Engine 2's Extra Chain and item A1 is moved to the Extra Chain of Recalculation Engine 2 as shown by arrow 1402. The lock is removed. Control then transfers to evaluate the next item, cell C1. Cell C1 contains the formula =A1+B1+C2. Item A1 has not been evaluated and now resides on Recalculation Engine 2. Accordingly, a lock request is issued again to Recalculation Engine 2's Extra Chain, and when received, item C1 is moved to the Extra Chain of Recalculation Engine 2 and placed after item A1 as indicated by arrow 1404.

Concurrently with the first of the above operations in Recalculation Engine 1, Recalculation Engine 2 attempts to evaluate item B1, the formula =A1\*C3. However, item B1 contains A1. The software then determines whether A1 is on Recalculation Engine 2 or Recalculation Engine 1. A1 may be assumed to still be on Recalculation Engine 1 at this point in time since the engines operate in parallel. Therefore item B1 is moved to the Extra Chain in Recalculation Engine 1 after first obtaining a lock on the Recalculation Engine 1's Extra Chain as indicated by arrow 1406. Upon transfer, the lock is removed. Control in Recalculation Engine 2 then moves to evaluate item B3. Item B3 has the formula =A3*4. Since the cell A3 contains the constant 2, the formula in cell B3 is immediately evaluated, and no further action in the normal chain in Recalculation Engine 2 takes place. At this same time, it is likely that item C1 is being transferred from Recalculation Engine 1 to the Extra Chain of Recalculation Engine 2.

Recalculation Engine 2 has completed all operations in its normal chain. Accordingly it then pulls the extra chain formulas into the normal chain and begins evaluation (not shown in FIG. 14 for simplicity). Recalc Engine 2 then begins evaluating the first formula, cell A1. Cell A1's formula is =4*B3. B3 has been "cleaned" as it has been evaluated and is now "8". Therefore item A1 is immediately evaluated and becomes a clean "32".

At the same time that Recalculation Engine 2 is calculating B3, Recalculation Engine 1 is evaluating the formula in cell B2. This dependent formula is =3*B1. B1 is the supporting formula. The program then determines that the formula in cell B1 is on its own Recalculation Engine 1 in its Extra Chain, so it establishes a self lock and moves the formula in cell B1 to a position immediately prior to the formula in cell B2 as shown by the arrow 1408 and attempts to evaluate the formula in cell B1. Cell B1's formula is =A1*C3. At this point item A1 is on Recalculation Engine 2's Extra Chain and we assume A1 has not been calculated. Therefore Recalculation Engine 1 obtains a lock on Recalculation Engine 2's Extra Chain and transfers the formula in cell B1 to the Extra Chain of Recalculation Engine 2 as shown by arrow 1410 and releases the lock. In Recalculation Engine 1, an attempt is again made to evaluate the formula in cell B2, but the formula in cell B2 is a dependent formula, with B1 being the supporting formula that was just transferred to recalculation Engine 2. Therefore Recalculation Engine 1 obtains a lock and transfers the formula in cell B2 to Recalculation Engine 2's Extra Chain as shown by arrow 1412.

Meanwhile, on Recalculation Engine 2, since the formula in cell B3 has been calculated and the formula in cell A1 has been calculated, the next formula, in cell C1, is evaluated. The formula in cell C1 is a dependent formula, depending on supporting formula in cell B1 and a constant in cell C2 and evaluated formula in cell A1. The formula in cell B1 is now in Recalculation Engine 2, and thus is moved ahead of the formula in cell C1 as indicated by the arrow 1414, and immediately evaluated. The formula in B1 is a dependent formula, depending on A1 and C3. At this time, the formula in cell A1 has been evaluated but the formula in cell C3 may not yet have been evaluated and, if this is the case, is located in Recalculation Engine 1. However, if C3 has been evaluated by this time, its value (16) is used to evaluate the formula in cell B1 and then the formula in cell C1 is evaluated. On the other hand, if C3 has not yet been evaluated, a lock is requested on Recalculation Engine's Extra chain, and, when locked, item B1 is moved again (dashed arrow 1416) to the Extra Chain of Recalculation Engine 1.

Finally, in Recalculation Engine 2, an attempt to evaluate the formula in cell B2 is made. The formula in B2 is a dependent formula, depending on B1. Since, by this time, the formula in cell B1 has likely been evaluated, B2 is evaluated and the recalculation is complete. In Recalculation Engine 1, processing will already have been completed with the evaluation of the formula in cell C3, or alternatively, if the formula in cell B1 was again moved to the Recalculation Engine 1 Extra Chain, with the evaluation of the formula in cell B1. This completes the operations in this third example.

Although the invention has been described in language specific to structural features, methodological acts, and computer readable media containing such acts, it is to be understood that the invention defined in the appended claims is not necessarily limited to the specific structure, acts or media described. As an example, the processing of formula evaluation does not have to be from left to right as illustrated in the examples. There needs to be no physical movement of formulas between engines. The same effect may be achieved by assigning flags to the cells involved, and simply changing the flags, and thus the pointers, that indicate the formulas to be processed or those which have already been processed or "cleaned". Therefore, the specific structure, acts or media are disclosed as preferred forms of implementing the claimed invention.

What is claimed is:

1. A method of processing supporting and dependent formulas in a spreadsheet program comprising:
   determining a number of available processors;
   if the number of available processors is at least two, allocating a recalculation engine to each available processor;
   distributing the formulas between the recalculation engines, wherein distributing the formulas comprises:
      selecting a first formula;
      randomly assigning the first formula to a random one of the recalculation engines; and
      repeating the selecting and assigning operations for each next formula until all formulas are assigned to one of the recalculation engines;
   evaluating the formulas distributed to each recalculation engine, wherein evaluating the formulas comprises:
      selecting a first formula;
      determining whether the first formula is a dependent formula or supporting formula;
      if the first formula is a supporting formula, evaluating the formula;
      if the first formula is a dependent formula, determining whether a supporting formula for this dependent formula is in the recalculation engine; and
      if the supporting formula is in dependent formula is in the recalculating engine, then placing the supporting formula ahead of the first formula; and
   displaying results of the evaluated formulas in cells of the spreadsheet, wherein the spreadsheet is displayed through the use of a display device.

2. A method as defined in claim 1 wherein the process is performed by an operating system.

3. A method as defined in claim 1 wherein the determining operation comprises querying a computer operating system upon program startup whether multiple processors are available.

4. A method as defined in claim 1 further comprising:
   determining whether this supporting formula placed ahead of the first formula is a dependent formula;
   if this supporting formula is not a dependent formula, evaluating this supporting formula; and
   if this supporting formula is a dependent formula, then determining whether another supporting formula for this dependent formula is in the recalculation engine, and, if so, then placing the another supporting formula ahead of the supporting formula and evaluating the another supporting formula.

5. A method as defined in claim 1 wherein the evaluating operation further comprises:
   if the first formula is a dependent formula and the supporting formula for this dependent formula is not in the recalculation engine, determining the recalculation engine location of the supporting formula and moving the first formula to that recalculation engine.

6. A method as defined in claim 1 wherein the evaluating operation further comprises:
if the first formula is a dependent formula and the supporting formula for this dependent formula is not in the recalculation engine, determining the recalculation engine location of the supporting formula and querying whether the recalculation engine having the supporting formula is finished calculating, and, if so, trying again to evaluate the dependent formula and, if not, moving the dependent formula to the recalculation engine having the supporting formula.

7. A method as defined in claim 6 wherein the dependent formula moved to the recalculation engine having the supporting formula is placed on an extra chain in that recalculation engine.

8. A method of processing a plurality of formulas in a spreadsheet program on an operating computing system having two processors, the method comprising computer instructions executable by the computing system for performing the following:
assigning a first recalculation engine to one of the two processors and a second recalculation engine to the other of the two processors;
distributing each formula to one of the first and second recalculation engines;
in each of the first and second recalculation engines:
determining whether a first/next formula is a dependent formula;
evaluating the first/next formula if the first/next formula is not dependent;
if the first/next formula is dependent, determining a location of a supporting formula;
if the supporting formula is in the same recalculation engine, moving the supporting formula ahead of the first/next formula; and
evaluating the supporting formula.

9. A method of processing as defined in claim 8 further comprising:
repeating the determining and evaluating operations for the next formula in the recalculation engine.

10. A method of processing as defined in claim 8 further comprising:
determining if the supporting formula is dependent;
if the supporting formula is dependent, determining a location of its supporting formula;
if its supporting formula is in the same recalculation engine, moving its supporting formula ahead of the supporting formula which it supports; and
evaluating its supporting formula and then evaluating the supporting formula.

11. A method of processing as defined in claim 10 further comprising repeating the determining, evaluating, moving and evaluating operations for each next formula in the first and second recalculation engines.

12. A method of processing as defined in claim 8 further comprising:
if the supporting formula is not in the same recalculation engine, moving the dependent formula to the other one of the first and second recalculation engines.

13. A method of processing as defined in claim 12 wherein moving the dependent formula comprises adding the dependent formula to an extra chain in the other one of the first and second recalculation engines.

14. A system for processing supporting and dependent formulas in a chain of formulas in a spreadsheet program comprising:
a module for determining a number of available processors and allocating a recalculation engine to each available processor;
a load control module for distributing the formulas between the recalculation engine, wherein distributing the formulas comprises:
selecting a first formula;
randomly assigning the first formula to a random one of the recalculation engines; and
repeating the selecting and assigning operations for each next formula until all formulas are assigned to one of the recalculation engines;
a processing module for concurrently evaluating the formulas distributed to each recalculation engine, wherein evaluating the formulas comprises:
selecting a first formula;
determining whether the first formula is a dependent formula or supporting formula;
if the first formula is a supporting formula, evaluating the formula;
if the first formula is a dependent formula, determining whether a supporting formula for this dependent formula is in the recalculation engine; and
if the supporting formula for this dependent formula is in the recalculating engine, then placing the supporting formula ahead of the first formula; and
a display module for displaying results of the evaluated formulas in cells of the spreadsheet.

15. A system as defined in claim 14 wherein the processing module resides in an operating system.

16. A system as defined in claim 14 wherein the determining module queries a computer operating system upon program startup whether multiple processors are available and then assigns a recalculation engine to each available processor.

17. A computer-readable medium containing computer executable instructions which when executed by a computer perform a method of processing supporting and dependent formulas in a spreadsheet program comprising:
determining a number of available processors;
if the number of available processors is at least two, allocating a recalculation engine to each available processor;
distributing the formulas between the recalculation engines, wherein distributing the formulas comprises:
selecting a first formula;
randomly assigning the first formula to a random one of the recalculation engines; and
repeating the selecting and assigning operations for each next formula until all formulas are assigned to one of the recalculation engines;
evaluating the formulas distributed to each recalculation engine, wherein evaluating the formulas comprises:
selecting a first formula;
determining whether the first formula is a dependent formula or supporting formula;
if the first formula is a supporting formula, evaluating the formula;
if the first formula is a dependent formula, determining whether a supporting formula for this dependent formula is in the recalculation engine; and
if the supporting formula for this dependent formula is in the recalculation engine, then placing the supporting formula ahead of the first formula; and displaying results of the evaluated formulas in cells of the spreadsheet.

18. A computer storage medium as defined in claim 17 wherein the determining operation in the method of processing comprises querying a computer operating system upon program startup whether multiple processors are available.

19. A computer storage medium containing computer executable instructions which when executed by a computer perform a method of processing a plurality of formulas in a spreadsheet program on an operating computing system having two processors, the method comprising:

assigning a first recalculation engine to one of the two processors and a second recalculation engine to the other of the two processors;

distributing each formula to one of the first and second recalculation engines;

in each of the first and second recalculation engines:

determining whether a first/next formula is a dependent formula;

evaluating the first/next formula if the first/next formula is not dependent;

if the first/next formula is dependent, determining a location of a supporting formula;

if the supporting formula is in the same recalculation engine, moving the supporting formula ahead of the first/next formula;

evaluating the supporting formula; and displaying results of the evaluated formulas in cells of the spreadsheet.

\* \* \* \* \*